US011187334B2

(12) United States Patent
Motha et al.

(10) Patent No.: US 11,187,334 B2
(45) Date of Patent: Nov. 30, 2021

(54) MANUAL RESET ACTUATOR FOR DIAPHRAGM CONTROL VALVE

(71) Applicant: Tyco Fire Products LP, Lansdale, PA (US)

(72) Inventors: Joshua Motha, Tiverton, RI (US); James O. Williams, Cranston, RI (US)

(73) Assignee: Tyco Fire Products LP, Lansdale, PA (US)

( * ) Notice: Subject to any disclaimer, the term of this patent is extended or adjusted under 35 U.S.C. 154(b) by 48 days.

(21) Appl. No.: 16/440,003

(22) Filed: Jun. 13, 2019

(65) Prior Publication Data

US 2020/0393055 A1 Dec. 17, 2020

(51) Int. Cl.
| | |
|---|---|
| *F16K 15/18* | (2006.01) |
| *F16K 7/17* | (2006.01) |
| *A62C 35/68* | (2006.01) |
| *F16K 17/04* | (2006.01) |
| *F16K 17/10* | (2006.01) |
| *F16K 31/60* | (2006.01) |

(52) U.S. Cl.
CPC ............... *F16K 15/18* (2013.01); *F16K 7/17* (2013.01); *A62C 35/68* (2013.01); *F16K 17/0453* (2013.01); *F16K 17/105* (2013.01); *F16K 31/60* (2013.01)

(58) Field of Classification Search
None
See application file for complete search history.

(56) References Cited

U.S. PATENT DOCUMENTS

| 10,571,040 B2* | 2/2020 | Babb ...................... F16K 31/05 |
| 2016/0279454 A1* | 9/2016 | Ringer ................... A62C 35/68 |
| 2018/0147433 A1* | 5/2018 | Williams ................ A62C 35/60 |

FOREIGN PATENT DOCUMENTS

| EP | 3 291 888 A1 | 3/2018 |
| WO | WO-2015/066710 A2 | 5/2015 |

OTHER PUBLICATIONS

International Search Report and Written Opinion on Application No. PCT/IB2020/055535, dated Sep. 9, 2020, 13 pages.

* cited by examiner

*Primary Examiner* — Daphne M Barry
(74) *Attorney, Agent, or Firm* — Foley & Lardner LLP

(57) ABSTRACT

A manual reset actuator is disclosed, which includes a main drain, a diaphragm release aperture fluidly coupled to a flow control valve, an upper chamber, a control port, a control orifice, an upper chamber supply orifice, and a sealing assembly, which includes a button, and a plunger. A pressure in the upper chamber exerts a downward force on the plunger. A spring exerts an upward force on the plunger. The fluid in the upper chamber is released via the control orifice, which lowers the pressure in the upper chamber, decreasing the downward force exerted on the plunger. When the downward force is less than the upward force, the spring forces the plunger upwards into an open configuration, which unseals the diaphragm release aperture. When the upward force is less than the downward force, the plunger remains in a closed configuration, which keeps the diaphragm release aperture sealed.

15 Claims, 4 Drawing Sheets

MANUAL RESET ACTUATOR FOR DIAPHRAGM CONTROL VALVE

BACKGROUND

Sprinkler systems utilize fire suppressants (e.g., water, fire suppressant agent, etc.) to suppress fires. The fire suppressant flows from a fire suppressant source to one or more nozzles through piping.

SUMMARY

At least one aspect relates to a manual reset actuator. The manual reset actuator includes a cover and a housing. The housing includes a main drain, a diaphragm release aperture, which is selectively fluidly coupled to the main drain such that the diaphragm release aperture is configured to fluidly couple the manual reset actuator assembly to a flow control valve, an upper chamber, a control port, a control orifice configured to fluidly couple the control port to the upper chamber, an upper chamber supply orifice configured to supply the upper chamber with a fluid, and a sealing assembly. The sealing assembly includes a button, which is configured to facilitate a user to actuate the sealing assembly, a plunger coupled to the button and configured to selectively seal a fluid flow path between the main drain and the diaphragm chamber port, and a key. The key is configured to slidably couple the button to the plunger, such that when the button is operated, the plunger prevents a fluid from exiting the main diaphragm port and a pressure of the fluid is formed in the upper chamber. The pressure is configured to exert a downward force on the plunger and a spring is configured to couple to the diaphragm release aperture and a bottom of the plunger and exert an upward force on the plunger. When the pressure in the upper chamber increases, the downward force on the plunger increases. The fluid in the upper chamber is released through the control port via the control orifice, such that releasing the fluid, lowers the pressure in the upper chamber, causing the downward force exerted on the plunger to decrease. When the downward force is less than the upward force, the spring forces the plunger upwards into an open configuration, which unseals the diaphragm release aperture. When the upward force is less than the downward force, the plunger remains in a closed configuration, which keeps the diaphragm release aperture sealed.

At least one aspect relates to a flow control valve and a manual reset actuator assembly. The flow control valve includes an inlet and an outlet configured to facilitate flow of a fluid into and out of the flow control valve, a diaphragm configured to substantially prevent flow of the flow between the inlet and the outlet when in an untripped configuration and allow flow of the fluid in a tripped configuration, a diaphragm chamber configured to contain a first pressure and a quantity of the fluid, and a flow control valve diaphragm chamber port configured to facilitate release of the first pressure in the diaphragm chamber. The flow control valve further includes a main supply port, configured to supply the manual reset actuator with the fluid. The manual reset actuator includes a diaphragm chamber port selectively fluidly coupled to a main drain and fluidly coupled to the diaphragm chamber of the flow control valve, an upper chamber, and a main supply orifice fluidly coupled to the upper chamber, such that the main supply orifice fluidly couples to the main supply port of the flow control valve to supply the upper chamber with the fluid. Further, the upper chamber fills with the fluid and a second pressure is formed in the upper chamber, which is configured to exert a downward force on a plunger. The manual reset actuator also includes a control port, a control orifice configured to fluidly couple the control port to the upper chamber, a button, the plunger coupled to the button and configured to selectively seal a fluid flow path between the main drain and the diaphragm chamber, and a spring coupled to a bottom of the plunger, configured to exert an upward force on the plunger.

At least one aspect relates to a method of resetting a flow control valve. The method includes fluidly coupling a manual reset actuator to the flow control valve, and supplying an inflow of a fluid to an upper chamber of the manual reset actuator via a supply orifice, such that the fluid in the upper chamber forms a pressure. The method further includes operating a button in a closed configuration, wherein the button couples to a plunger which is configured to seal a diaphragm port, and holding the button in the closed configuration until the fluid fills the upper chamber and the pressure increases to form a downward force on the plunger, therefore preventing the button and plunger from moving to an open configuration.

DETAILED DESCRIPTION

Figure 1:
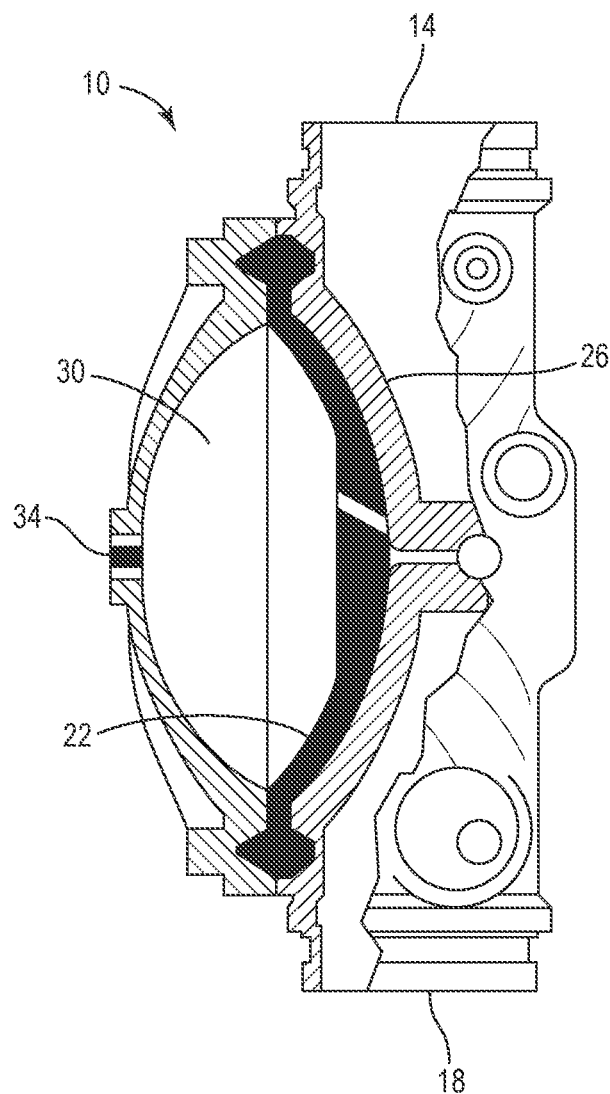
FIG. 1 is a section view of a flow control valve, according to an example implementation.

Before turning to the figures, which illustrate certain examples, it should be understood that the present disclosure is not limited to the details or methodology set forth in the description or illustrated in the figures. It should also be understood that the terminology used herein is for the purpose of description only and should not be regarded as limiting Referring generally to the figures, fire suppression system includes piping which facilitates transfer of fire suppressant (e.g., fire suppressant agent, water, etc.) through a space (e.g., a building, a vehicle, a kitchen, an attic, a garage, a dock etc.). The fire suppressant is configured to subdue or prevent the spread of a fire in a hazard area. One or more detectors are configured to sense a condition (e.g., temperature, thermal optics, smoke, etc.) in the hazard area. The detectors then send a signal (e.g., electrical, mechanical, pneumatic, etc.) to a controller which activates an actuator, configured to facilitate the fire suppressant to flow into the piping. The piping fluidly couples a fire suppressant tank to one or more sprinkler heads. The sprinkler heads are configured to distribute the fire suppressant throughout the hazard area and suppress the fire.

Fire suppression systems described herein can include a flow control valve incorporated in the piping and configured to facilitate the flow to the sprinkler heads. The flow control valve includes a diaphragm, which is configured to block an inlet and an outlet of the flow control valve. The inlet is coupled to one end of the piping and the outlet is coupled to another end of the piping, such that a fluid connection between the piping through the flow control valve is facilitated. The flow control valve includes a diaphragm chamber, in which a diaphragm is located, configured to contain a volume of fluid. The fluid in the diaphragm chamber creates pressure and forces the diaphragm into a closed position, therefore blocking the outlet from the inlet. The diaphragm chamber includes a diaphragm connection port, which is configured to facilitate the venting of the diaphragm chamber. Venting of the diaphragm chamber allows the diaphragm to move from the closed position to an open position, such that the inlet and the outlet are fluidly connected. The diaphragm chamber of the flow control valve is fluidly coupled to a manual reset actuator.

The manual reset actuator can help vent the fluid in the diaphragm chamber as well as reset the flow control valve after the flow control valve trips, via only a user and the flow of the fire suppressant agent. The manual reset actuator includes a main drain, which the fluid from the diaphragm chamber can flow out, an upper chamber and an upper chamber supply orifice configured to supply the upper chamber fluid from the diaphragm chamber in small quantities. The upper chamber receives the small amount of fluid flow from the diaphragm chamber and builds pressure. The pressure exerts a downward force which substantially prevents a plunger from lifting off an actuator diaphragm chamber port, substantially preventing the pressure and the fluid from releasing from the diaphragm chamber. During activation, the pressure and fluid in the upper chamber is released through a connection port. A spring then overcomes the downward force exerted by the pressure, which allows the plunger to lift off the actuator diaphragm chamber port and allows the diaphragm chamber to release into atmosphere. The manual reset actuator further includes a button which allows the user to reset the flow control valve. The button is pressed and held in a pressed configuration until the diaphragm chamber and the upper chamber are pressurized. After pressurization, the user is able to release the button and the button stays in the pressed configuration due to the pressure in the upper chamber exerting the downward force greater than an upward force of the spring.

Figure 2:
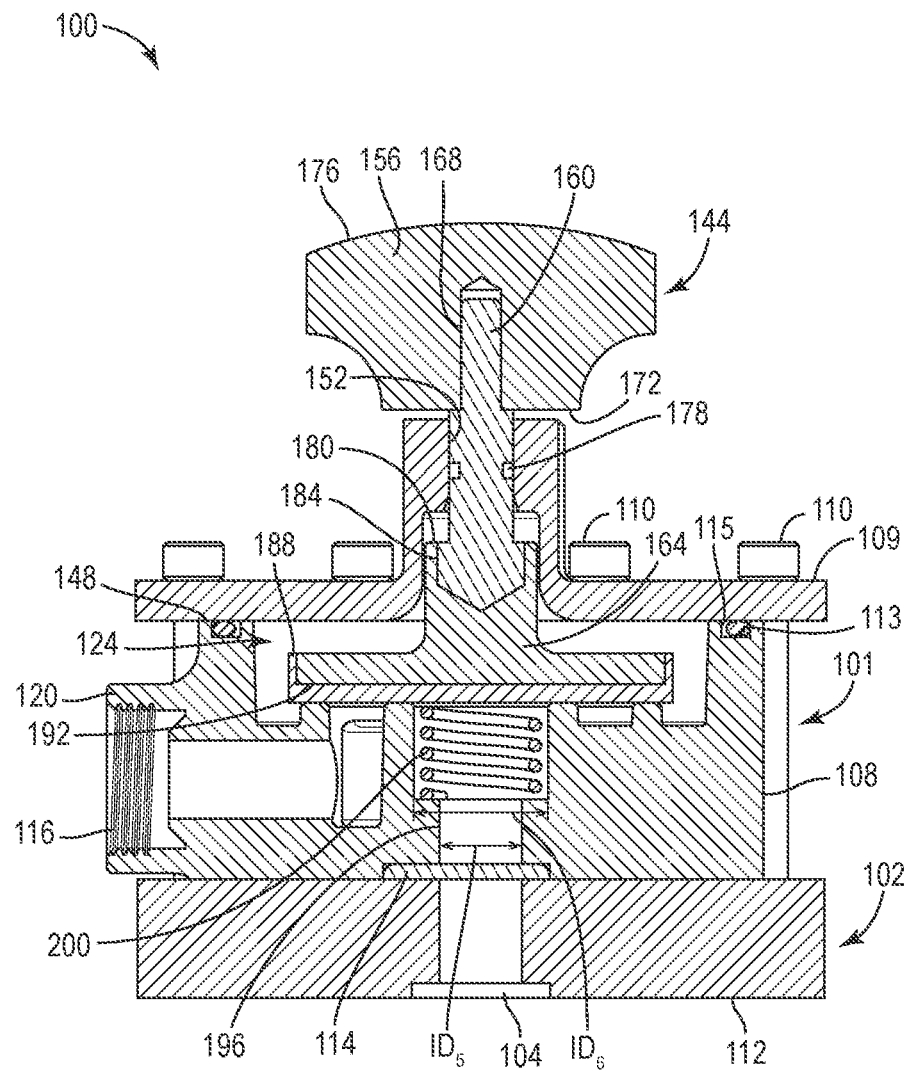
FIG. 2 is a first section view of a manual reset actuator, according to an example implementation.
Figure 3:
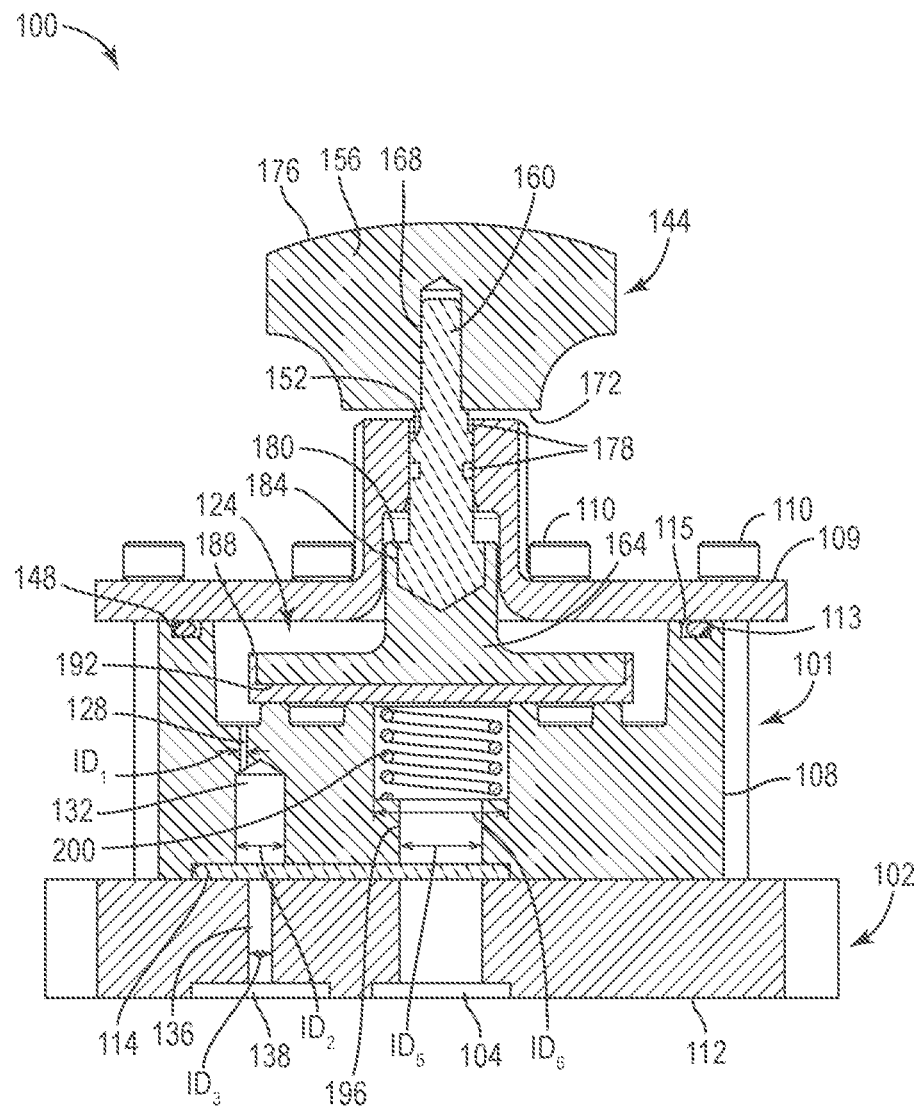
FIG. 3 is a second section view of the example manual actuator of FIG. 2.
Figure 4:
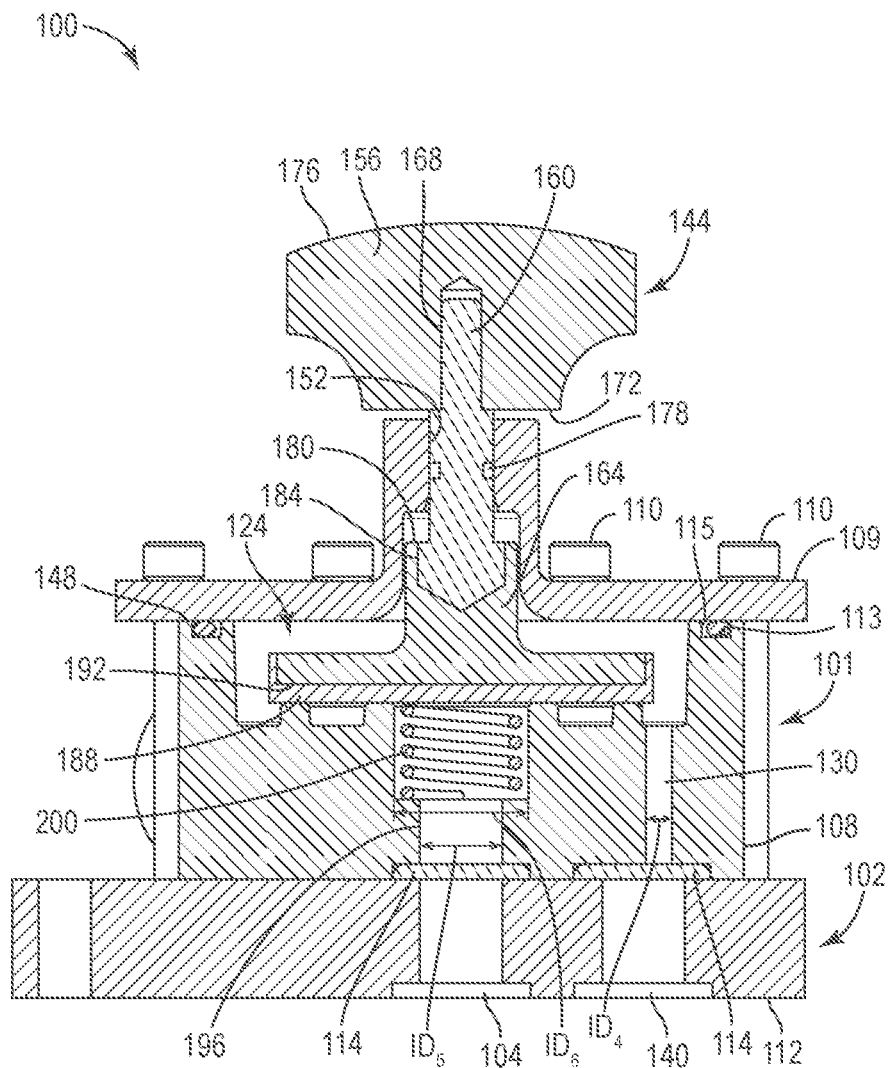
FIG. 4 is a third section view of the example manual reset actuator of FIG. 3.

Referring to FIGS. 2-4, an example manual reset actuator is shown. The manual reset actuator can be configured to selectively reset a flow control valve 10. The flow control valve 10 can be configured to selectively fluidly couple a source of fire suppressant (e.g., water, foam, etc.) to one or more sprinkler heads. The flow control valve 10 includes an aperture configured for flow into the flow control valve 10, shown as inlet 14, and another aperture configured for flow out of the flow control valve 10, shown as outlet 18. The inlet 14 facilitates inflow of the fire suppressant into the flow control valve 10 from the source of fire suppressant. The outlet 18 facilitates outflow of the fire suppressant into piping and further to the sprinkler heads. The inlet 14 and the outlet 18 are selectively fluidly connected. By way of example, the inlet 14 and the outlet 18 are fluidly connected when the flow control valve 10 is in a tripped configuration. The tripped configuration allows free flow from the inlet 14 to the outlet 18 and out of the flow control valve 10, such that the flow control valve 10 can be configured to act as a pipe (i.e., no flow is blocked or inhibited). In the tripped configuration, the flow control valve 10 can also be configured to allow substantially free flow (i.e., a small amount of flow is blocked or rerouted). The tripped condition can occur due to a signal (e.g., electrical, mechanical, pneumatic, etc.) from a user, a controller, etc. By way of another example, the inlet 14 and the outlet 18 are blocked from each other in an untripped configuration. In the untripped configuration, the inlet 14 and the outlet 18 are unable to fluidly communicate, such that flow is fully blocked through the flow control valve 10. Flow can also be substantially blocked, such that a small amount of flow is rerouted to another location.

The flow control valve 10 also includes a deforming member or a clapper, shown as diaphragm 22. The diaphragm 22 can be made of rubber, plastic, composite, etc. The diaphragm 22 can be configured to selectively reconfigure the flow control valve 10 between the tripped configuration and the untripped configuration, to substantially allow or prevent flow through the flow control valve 10. The diaphragm 22 also can be configured to substantially prevent fluid communication between one or more cavities, shown as main flow chamber 26 and diaphragm chamber 30. The main flow chamber 26 includes the inlet 14 and the outlet 18, and can be configured to allow the fire suppressant to flow freely through the flow control valve 10. The diaphragm chamber 30 can be configured to hold a small amount of a fluid (e.g., fire suppressant, gas, etc.) such that a first pressure can be formed in the diaphragm chamber 30. The first pressure formed by the fluid can force the diaphragm 22 into the untripped configuration, blocking the inlet 14 from the outlet 18. The first pressure and the fluid can be released through a first aperture in the diaphragm chamber 30, shown as valve diaphragm chamber port 34. The valve diaphragm chamber port 34 can be configured to vent in response to a transition from the untripped configuration to the tripped configuration.

The flow control valve 10 can fluidly couple to a lower section 102 of the manual reset actuator via the valve diaphragm chamber port 34, which fluidly couples to a first aperture in the manual reset actuator, shown as actuator diaphragm chamber port 104. The fluid and first pressure in the diaphragm chamber 30 can vent through the valve diaphragm chamber port 34 and the actuator diaphragm chamber port 104 to reach atmosphere. The actuator diaphragm chamber port 104 can be disposed on an interface surface 112 of the lower section 102 of the manual reset actuator. The manual reset actuator can also include an upper section 101. The upper section 101 includes a casing, shown as housing 108, and a cover, shown as cover plate 109. The housing 108 and the cover can be fixedly coupled via one or more fasteners 110 (e.g., screws, bolts, rivets, etc.). The housing 108 and the cover can also be fixedly coupled via adhesive, welding, etc. The housing 108 and the cover can include a deforming sealing member, shown as housing gasket 113. The housing gasket 113 is configured to substantially seal the housing 108 and the cover to form a water tight seal when the housing 108 and the cover are coupled. The housing gasket 113 is disposed within a groove 115 in the housing 108. The housing 108 can be configured to substantially encase at least one of the components of the manual reset actuator, as will be described below. The upper section 101 and the lower section 102 can be configured to fixedly fluidly couple to each other via adhesive, fasteners, etc. One or more lower gaskets 114 can be included between the upper section 101 and the lower section 102 to facilitate forming water tight seals between various ports, orifices, and reservoirs, as will be described below.

The housing 108 includes an outlet hole, shown as main drain 116, which can facilitate egress of fluid within the manual reset actuator. The main drain 116 can be fluidly connected to the actuator diaphragm chamber port 104, therefore facilitating release of the fluid and first pressure to atmosphere through the main drain 116. The main drain 116 can be disposed on a first side 120 of the manual reset actuator. The main drain 116 can fluidly couple to a conduit (e.g., a pipe, a tube, etc.), which facilitates transfer of the vented fluid and pressure to a user designated destination.

The designated destination can be back into the piping of the fire suppression system, into a reservoir of water, into an ambient pressure, etc.

The housing 108 of the manual reset actuator can also include a basin, shown as upper chamber 124. The upper chamber 124 can be configured to hold a quantity of the fluid such that a second pressure is formed within the upper chamber 124. The upper chamber 124 can be configured to receive the fluid via an ingress aperture, shown as upper chamber supply orifice 128, and release the fluid via an egress aperture, shown as control orifice 130. The upper chamber supply orifice 128 and the control orifice 130 can each be disposed on opposite sides of the upper chamber 124, therefore the fluid flows through an entirety of the upper chamber 124, substantially allowing the second pressure to rise in the upper chamber 124. The upper chamber supply orifice 128 and the control orifice 130 can each be disposed in close proximity to each other, therefore the upper chamber 124 can be configured to be smaller in size, therefore reducing the size of the manual reset actuator.

The upper chamber supply orifice 128 can be a controlled drilling such that the flow rate of the fluid which can pass through the upper chamber supply orifice 128 into the upper chamber 124, can be manipulated, therefore increasing the size of the controlled drilling can increase the flow rate of the fluid and decreasing the size of the controlled drilling can decrease the flow rate of the fluid. The upper chamber supply reservoir 132 can be configured to receive the fluid from the diaphragm chamber 30 via a conduit disposed in the lower section 102, shown as main supply orifice 136. The main supply orifice 136 and the upper chamber supply reservoir 132 can be configured to have one of the lower gaskets 114 disposed between to form a water tight seal. The main supply orifice 136 is configured to fluidly couple an aperture on the bottom of the lower section 102, shown as actuator main supply port 138, and the upper chamber supply reservoir 132 and have a third inner diameter $ID_3$. The third diameter $ID_3$ of the main supply orifice 136, a second diameter $ID_2$ of the upper chamber supply reservoir 132, and a first diameter $ID_1$ of the upper chamber supply orifice 128 can be equal, such that the actuator main supply port 138 and the upper chamber 124 are fluidly coupled via a single conduit (e.g., tube, pipe, etc.). The third diameter $ID_3$ of the main supply orifice 136, the second diameter $ID_2$ of the upper chamber supply reservoir 132, and the first diameter $ID_1$ of the upper chamber supply orifice 128 can be different, such that each diameter of each component facilitates a specific function, as described above. By way of example, the first inner diameter $ID_1$ of the upper chamber supply orifice 128 is smaller than the second inner diameter $ID_2$ of the upper chamber supply reservoir 132 and the third inner diameter $ID_3$ of the main supply orifice 136. Therefore, more fluid can enter the upper chamber supply reservoir 132 via the main supply orifice 136 than can exit the upper chamber supply reservoir 132 via the upper chamber supply orifice 128, which substantially prevents air pockets, loss of pressure, etc. backwards in the manual reset actuator (i.e., the upper chamber 124 cannot lose pressure through the main supply orifice 136, the upper chamber 124 can only gain pressure.)

The upper chamber 124 further includes the control orifice 130, having a fourth inner diameter $ID_4$. The control orifice 130 can be configured to facilitate egress of the fluid and the pressure within the upper chamber 124. The fourth inner diameter $ID_4$ of the control orifice 130 can be larger than the first inner diameter $ID_1$ of the upper chamber supply orifice 128. Therefore, outflow from the upper chamber 124 can be larger than inflow into the upper chamber 124, which facilitates venting of the upper chamber 124. The control orifice 130 further can fluidly couple to another aperture in the lower section 102, shown as control port 140. Whereby the control port 140 fluidly coupling (e.g., remotely, directly, etc.) to an actuator, facilitates venting of the fluid and the pressure in the upper chamber 124. The actuator can control the release of the pressure and the fluid in the upper chamber 124. The actuator can respond to a signal from a controller (e.g., a controller of the fire suppression system), a manual actuation device, etc. and in response to the signal, allow egress of the fluid in the upper chamber 124. By way of example, when the flow rate out of the upper chamber 124 via the control orifice 130 exceeds the flow rate into the upper chamber 124 via the upper chamber supply orifice 128, the pressure in the upper chamber 124 will drop. The actuator coupled to the control port 140 can be incorporated in the flow control valve 10, therefore the control port 140 directly couples to the flow control valve 10. The actuator coupled to the control port 140 can be located remotely of the flow control valve 10 and the manual reset actuator, therefore the fluid from the upper chamber 124 flows through a conduit after exiting the manual reset actuator.

The upper section 101 of the manual reset actuator further includes a sealing assembly 144. The sealing assembly 144 can be configured to facilitate the user substantially preventing fluid from exiting the diaphragm chamber 30 via the valve diaphragm chamber port 34 and the actuator diaphragm chamber port 104. The sealing assembly 144 can be further configured to actuate mechanically, electrically, pneumatically, etc. The sealing assembly 144 slidingly couples to the cover plate 109 via an aperture, shown as interface port 152. The sealing assembly 144 includes an interface part, shown as button 156, configured to facilitate the user actuating the sealing assembly 144. The button 156 is configured to facilitate resetting of the manual reset actuator and is disposed outwardly of the housing 108 such that the button 156 cannot ingress into the housing 108. The button 156 can be a different mechanical activation device (e.g., a lever, a switch, etc.). The button 156 further can couple to an elongated member, shown as key 160, which can couple the button 156 to a sealing member, shown as plunger 164. The key 160 can extend at least partially into an aperture in the button 156, shown as button recess 168. The button recess 168 can extend at least partially from a lower side 172 of the button 156 to an upper side 176 of the button 156. The button recess 168 and the key 160, each can include threading, which facilitates fixedly coupling the key 160 to the button 156. The key 160 further can include cutouts, shown as notches 178, configured to interface with the button 156, the housing 108, the plunger 164, etc. or can be configured to receive a deforming sealer (e.g., gasket, O-ring, etc.). The deforming sealer can be configured to seal the interface port 152, such that fluid is substantially prevented from exiting the manual reset assembly via the interface port 152. The key 160 can also extend at least partially into an aperture in the top side 180 of the plunger 164, shown as plunger aperture 184, to facilitate movement of the plunger 164 when the button 156 is pressed. The key 160 can be configured to slide within the plunger aperture 184, which facilitates movement of the plunger 164 to cover the actuator diaphragm chamber port 104 and further facilitates movement of the button 156 while the plunger 164 is covering the actuator diaphragm chamber port 104, which prevents accidental removal of the plunger 164 from the diaphragm chamber port 104.

The plunger 164 can facilitate sealing the actuator diaphragm chamber port 104 from the main drain 116, such that substantially no fluid or pressure can leak from the diaphragm chamber 30 through the actuator diaphragm chamber port 104. The plunger 164 can be disposed in the upper chamber 124 of the manual reset actuator. The plunger 164 can include a deforming member, shown as sealer 188, disposed on a sealing side 192, and can deform and seal the actuator diaphragm chamber port 104. Whereby the plunger 164 having the sealer 188 substantially only on the sealing side, can facilitate the plunger 164 being substantially rigid, such that a force can be exerted on the plunger 164 and the plunger 164 covers the entirety of the actuator diaphragm chamber port 104 but also has the sealer 188, which can deform when squeezed between the plunger 164 and the actuator diaphragm chamber port 104, thus forming a water tight seal over the actuator diaphragm chamber port 104.

The valve diaphragm chamber port 34 in the lower section 102 fluidly couples to an aperture, shown as diaphragm release aperture 196. The diaphragm release aperture 196 and the valve diaphragm chamber port 34 can include one of the lower gaskets 114 disposed between, such that a water tight seal is formed between the diaphragm release aperture 196 and the valve diaphragm chamber port 34. The diaphragm release aperture 196 can include a smaller inner diameter $ID_5$ and a larger inner diameter $ID_6$. The smaller inner diameter $ID_5$ can be disposed closer to the lower section 102 than the larger inner diameter $ID_6$ as well as the smaller inner diameter $ID_5$ can be a smaller diameter than the larger inner diameter $ID_6$. The larger inner diameter $ID_6$ of the diaphragm release aperture 196 further can include a resilient member, shown as spring 200. The spring 200 can be configured to apply an upward force on the plunger 164.

By way of example, the manual reset actuator and the flow control valve 10 can be configured to transition between the tripped configuration and the untripped configuration, as described above. In the untripped configuration, the diaphragm 22 substantially prevents the fluid from passing through the main flow chamber 26 to the outlet 18. To reach the untripped configuration from the tripped configuration, the user actuates the button 156, such that the plunger 164 depresses the spring 200 to a fully depressed configuration and the plunger 164, particularly the sealer 188, substantially covers the diaphragm release aperture 196, which substantially prevents fluid from leaking through the diaphragm release aperture 196. While the button 156 is fully depressed, the diaphragm chamber 30 is supplied a small amount of flow from the fluid flowing into the inlet 14, which fills the diaphragm chamber 30. The diaphragm 22 is held in place by the first pressure and the fluid in the diaphragm chamber 30. The fluid flows to the upper chamber supply reservoir 132 via a source of fluid (e.g., the piping, etc.), the actuator main supply port 138, and the main supply orifice 136. The upper chamber supply orifice 128 transfers the fluid in the upper chamber supply reservoir 132 to the upper chamber 124. The main supply orifice 136 can supply more fluid into the upper chamber supply reservoir 132 than the upper chamber supply orifice 128 allows fluid to flow out of the upper chamber supply reservoir 132, such that the upper chamber supply reservoir 132 is substantially always full.

The upper chamber 124 fills with the fluid from the upper chamber supply orifice 128 to form the second pressure, which increases until the second pressure exerts a downward force on the plunger 164 greater than the upward force the spring 200 exerts on the plunger 164. Therefore, the user can release the button 156 and the plunger 164 will stay depressed. A small amount of fluid can exit the upper chamber 124 via the control orifice 130 and control port 140 and the manual reset actuator will remain in the untripped configuration as long as the amount of fluid exiting the upper chamber 124 remains substantially equal to or less than the amount of fluid entering the upper chamber 124 via the upper chamber supply orifice 128.

If the amount of fluid exiting the upper chamber 124 increases such that the amount of fluid exiting is greater than the amount of fluid entering the upper chamber 124, the second pressure in the upper chamber 124 will begin to drop. By way of example, if the second pressure in the upper chamber 124 drops to less than 10 psi, the manual reset actuator and the flow control valve 10 with transition to the tripped configuration. During transition to the tripped configuration, the actuator coupled to the control port 140 facilitates release of the fluid in the upper chamber 124 at a rate greater than the rate entering via the upper chamber supply orifice 128. Once the second pressure in the upper chamber 124 drops below a threshold pressure, the downward force exerted on the plunger 164 by the second pressure will be less than the upward force exerted on the plunger 164 by the spring 200. Therefore, the spring 200 will raise the sealing assembly 144, thus unsealing the diaphragm release aperture 196. The fluid within the diaphragm chamber 30 begins to release via the valve diaphragm chamber port 34, the actuator diaphragm chamber port 104, and the diaphragm release aperture 196. Due to the sealing assembly 144 raising, the main drain 116 is now fluidly coupled to the diaphragm release aperture 196, which facilitates the fluid to exit the main drain 116 and lower the first pressure within the diaphragm chamber 30. The lowering of the first pressure within the diaphragm chamber 30 allows the diaphragm 22 to return to the tripped configuration, which allows for the inlet 14 and the outlet 18 to be fluidly coupled and the fluid can travel between the inlet 14 and the outlet 18.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. For example, the spring 200 may be incorporated in the plunger 164 of the sealing assembly 144. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A manual reset actuator, comprising:
   a cover;
   a housing, comprising;
      a main drain;
      a diaphragm release aperture selectively fluidly coupled to the main drain,
   wherein the diaphragm release aperture is configured to fluidly couple the manual reset actuator to a flow control valve;
      an upper chamber;
      a control port;
      a control orifice configured to fluidly couple the control port to the upper chamber;
      an upper chamber supply orifice configured to supply the upper chamber with a fluid;
      an upper chamber supply reservoir having a first diameter;
      a main supply orifice fluidly coupled with the upper chamber by the upper chamber supply orifice and the upper chamber supply reservoir, the main supply orifice having a second diameter, the first diameter being larger than the second diameter;
      the main supply orifice, the upper chamber supply orifice, and the control orifice parallel to a longitudinal axis of the manual reset actuator;
   a sealing assembly, comprising;
      a button, configured to facilitate a user to actuate the sealing assembly;
      a plunger coupled to the button and configured to selectively seal a fluid flow path between the main drain and a diaphragm chamber port;
      a key, configured to slidably couple the button to the plunger;
   wherein when the button is operated, the plunger prevents the fluid from exiting the main drain and a pressure of the fluid is formed in the upper chamber;
   the pressure is configured to exert a downward force on the plunger;
      a spring, configured to couple to the diaphragm release aperture and a bottom of the plunger and exert an upward force on the plunger;
   wherein, when the pressure in the upper chamber increases, the downward force on the plunger increases;
   the fluid in the upper chamber is released through the control port via the control orifice, wherein releasing the fluid, lowers the pressure in the upper chamber, causing the downward force exerted on the plunger to decrease;
   wherein, when the downward force is less than the upward force, the spring forces the plunger upwards into an open configuration, which unseals the diaphragm release aperture; and
   wherein, when the upward force is less than the downward force, the plunger remains in a closed configuration, which keeps the diaphragm release aperture sealed.

2. The assembly of claim 1, wherein the control port is configurable to couple to a flow control valve.

3. The assembly of claim 1, wherein a first pressure in the upper chamber is changed when an inflow of the fluid via the upper chamber supply orifice and an outflow of the fluid via the control orifice are unequal.

4. The assembly of claim 1, wherein when an inflow of the fluid via the upper chamber supply orifice is larger than an outflow of the fluid via the control orifice, a first pressure in the upper chamber increases.

5. The assembly of claim 1, wherein when an inflow of the fluid via the upper chamber supply orifice is smaller than an outflow of the fluid via the control orifice, a first pressure in the upper chamber decreases.

6. The assembly of claim 1, wherein when the pressure in the upper chamber falls below 10 psi, the upward force exerted on the plunger by the spring is greater than the downward force exerted on the plunger by the pressure.

7. A flow control valve and manual reset actuator assembly, comprising:
   the flow control valve, comprising:
      an inlet and an outlet configured to facilitate flow of a fluid into and out of the flow control valve;
      a diaphragm configured to substantially prevent the flow between the inlet and the outlet when in an untripped configuration and allow the flow of the fluid in a tripped configuration;
      a diaphragm chamber configured to contain a first pressure and a quantity of the fluid;
      a flow control valve diaphragm chamber port configured to facilitate release of the first pressure in the diaphragm chamber;
      a main supply port, configured to supply the manual reset actuator with the fluid;
   the manual reset actuator, comprising:
      a diaphragm chamber port selectively fluidly coupled to a main drain and fluidly coupled to the diaphragm chamber of the flow control valve;
      an upper chamber;
      an upper chamber supply reservoir having a first diameter;

a main supply orifice fluidly coupled with the upper chamber by the upper chamber supply reservoir and an upper chamber supply orifice, wherein the main supply orifice has a second diameter, the first diameter being larger than the second diameter; and the main supply orifice and the upper chamber supply orifice parallel to a longitudinal axis of the manual reset actuator;

wherein the main supply orifice fluidly couples to the main supply port of the flow control valve to supply the upper chamber with the fluid;

wherein the upper chamber fills with the fluid and a second pressure is formed in the upper chamber, which is configured to exert a downward force on a plunger;

a control port;

a control orifice configured to fluidly couple the control port to the upper chamber, the control orifice parallel to the longitudinal axis of the manual reset actuator;

a button;

the plunger coupled to the button and configured to selectively seal a fluid flow path between the main drain and the diaphragm chamber; and a spring coupled to a bottom of the plunger, configured to exert an upward force on the plunger.

8. The assembly of claim 7, wherein the control port is configurable to couple to a flow control valve.

9. The assembly of claim 7, wherein the second pressure in the upper chamber is changed when an inflow of the fluid via an upper chamber supply orifice and an outflow of the fluid via the control orifice are unequal.

10. The assembly of claim 7, wherein when an inflow of the fluid via an upper chamber supply orifice is larger than an outflow of the fluid via the control orifice, the second pressure in the upper chamber increases.

11. The assembly of claim 7, wherein when an inflow of the fluid via an upper chamber supply orifice is smaller than an outflow of the fluid via the control orifice, the second pressure in the upper chamber decreases.

12. The assembly of claim 7, wherein when the first pressure in the upper chamber decreases, the downward force exerted on the plunger decreases, and when the downward force on the plunger is less than the upward force on the plunger exerted by the spring, the plunger is forced in an upward direction.

13. The assembly of claim 7, wherein when the plunger is forced in an upward direction, the diaphragm chamber port, and the main drain are fluidly coupled facilitating the release of the fluid and thus a drop in the first pressure in the diaphragm chamber.

14. The assembly of claim 7, wherein when the first pressure in the diaphragm chamber drops, the diaphragm moves to the tripped configuration, which facilitates fluidly coupling the inlet and the outlet of the flow control valve.

15. The assembly of claim 7, wherein when the pressure in the upper chamber falls below 10 psi, the upward force exerted on the plunger by the spring is greater than the downward force exerted on the plunger by the second pressure.

* * * * *